United States Patent Office 2,928,841
Patented Mar. 15, 1960

2,928,841

PHOSPHOROTHIOLOTHIONATE DERIVATIVES OF HYDANTOINS

Richard L. McConnell and Harry W. Coover, Jr., Kingsport, Tenn., assignors to Eastman Kodak Company, Rochester, N.Y., a corporation of New Jersey No Drawing. Application September 6, 1957
Serial No. 682,308

12 Claims. (Cl. 260—309.5)

This invention relates to novel organophosphorus compounds and to a method for producing these compounds. In a specific aspect this invention relates to novel organophosphorus compounds derived from dialkyl phosphorothiolothionates and a hydantoin or a thiohydantoin.

The value and growing importance of organophosphorus compounds has been established in many fields of activity. This valuable group of compounds has found employment as insecticides, stabilizers for polyesters and other similar resins, fungicides, and related uses. Therefore, it is of considerable importance to the art to develop new organophosphorus compounds that possess the valuable and desirable properties set forth above. Consequently, it is an object of this invention to provide new organophosphorus compounds that are particularly useful as insecticides. It is a further object of this invention to provide a novel and useful procedure for producing these organophosphorus compounds.

The compounds within the scope of this invention have the following structural formula:

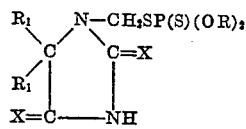

wherein R is a lower alkyl radical containing from 1 to 4 carbon atoms, one X is oxygen and the other X is selected from the group consisting of oxygen and sulfur and $R_1$ is selected from the group consisting of hydrogen and lower alkyl radicals containing from 1 to 4 carbon atoms. The alkyl radicals in the above structural formula can be methyl, ethyl, propyl, isopropyl, butyl, and isobutyl. Thus, the compounds of this invention are organophosphorus derivatives of a hydantoin, a 2-thiohydantoin or a 4-thiohydantoin.

The compounds within the scope of this invention can be prepared by reacting a dialkyl phosphorothiolothionate with formaldehyde and either a hydantoin or a thiohydantoin. The reaction involved in producing the compound within the scope of this invention is illustrated by the following equation:

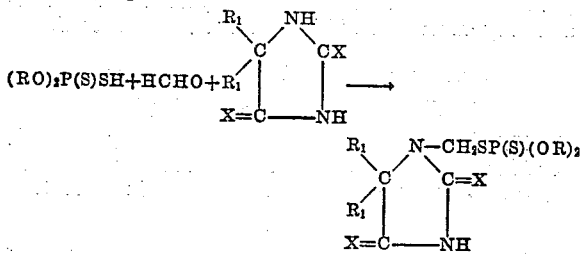

wherein R, $R_1$ and X are as defined above.

The dialkyl phosphorothiolothionates employed in practicing this invention can be readily prepared by the reaction of phosphorus pentasulfide with an appropriate alcohol. The hydantoins that are used in the practice of this invention can be prepared by the reaction of a suitable aldehyde or ketone with hydrogen cyanide and ammonium carbonate.

The reaction ordinarily proceeds without the aid of a catalyst and in general it is desirable to employ a suitable organic solvent for the reaction. Among the organic solvents that can be used are the normally liquid aliphatic and aromatic hydrocarbons, for example, hexane, heptane, octane, benzene, toluene, xylene, and the like. Additionally, chlorinated derivatives of the above-mentioned hydrocarbons can be used and in some instances ethers, such as diethyl ether, and the like can be employed. It is usually desirable to employ the formaldehyde in the form of an aqueous solution such as a 37% by weight solution that is available commercially. The temperature for the reaction usually varies from 0 to 200° C. with the preferred temperature being within the range of 25 to 125° C. Suitable reaction times have been found to be within the range of one to eight hours.

The following examples are illustrative of this invention and demonstrate the utility of the new compounds prepared in accordance with this invention.

*Example 1.—O,O-diethyl S-(5-isopropyl-2,4-dioxo-1-imidazolidinylmethyl) phosphorothiolothionate*

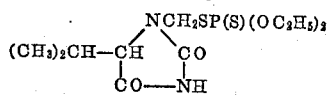

5-isopropylhydantoin (0.084 mole), formalin (0.1 mole), and diethyl phosphorothiolothionate (0.084 mole) were placed in 150 ml. of benzene and refluxed gently for 2 hours. The benzene solution was washed with dilute aqueous sodium carbonate solution and then with water. After drying the benzene solution over anhydrous sodium sulfate, the benzene was removed under reduced pressure leaving the product as a light yellow, viscous oil, $n_D^{20}$ 1.5282. (Analysis for P=9.28%; theory, P=9.10%.)

*Example 2.—O,O-dimethyl S-(2,4-dioxo-1-imidazolidinylmethyl) phosphorothiolothionate*

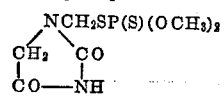

This product was prepared from hydantoin (0.1 mole), formalin (0.12 mole), and dimethyl phosphorothiolothionate (0.1 mole) according to the procedure of Example 1.

*Example 3.—O,O-diethyl S-(5,5-dimethyl-2,4-dioxo-1-imidazolidinylmethyl) phosphorothiolothionate*

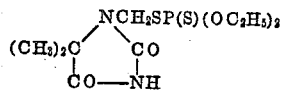

This compound was prepared from 5,5-dimethylhydantoin (0.1 mole), formalin (0.12 mole), and diethyl phosphorothiolothionate (0.1 mole) according to the procedure of Example 1.

*Example 4.—O,O-diisopropyl S-[5-(1-ethylpentyl)-2,4-dioxo-1-imidazolidinylmethyl] phosphorothiolothionate*

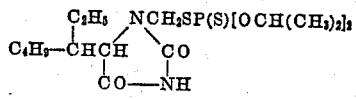

This product was prepared from 5-(1-ethylpentyl) hydantoin (0.1 mole), formalin, (0.12 mole), and diisopropyl phosphorothiolothionate (0.1 mole) according to the procedure of Example 1 except that toluene was used as the solvent rather than benzene.

Example 5.—O,O-diethyl S-(5-methyl-2-thioxo-4-oxo-1-imidazolidinylmethyl) phosphorothiolothionate

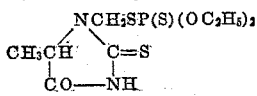

This product was prepared from 5-methyl-2-thiohydantoin (0.1 mole), formalin (0.12 mole) and diethyl phosphorothiolothionate (0.1 mole) according to the procedure of Example 1 except that methyl chloroform was used as the solvent rather than benzene.

Example 6.—Utility

Tests against mites and mite eggs were carried out in the following manner. Acetone solutions containing 1% of the candidate compounds were prepared and diluted with water to give solutions of the desired concentration for testing. Two heavily infested bean leaves containing both eggs and adult two-spotted mites (*Tetranychus bimaculatus* Harvey) were carefully dipped in the above solutions and dried in a gentle air stream. The leaves were then placed on damp paper toweling in Petri dishes and observed after 24 hours for mortality among the adult mites. The leaves are observed again after 7 days to determine the number of eggs killed by the treatment. Similar tests were carried out against cowpea aphids (*Aphis medicaginis* Koch). It should be noted that tests using acetone-water solutions (containing none of the toxicant) kill neither mites, mite eggs, nor aphids.

Data on houseflies (*Musca domestica* L.) was obtained by a topical application method. The toxicant was dissolved in acetone at the desired concentration and applied through a hypodermic syringe. The accurately measured amounts were determined by a micrometer which was set to deliver 1 microliter of the toxicant solution on the mid-thoracic point of each of 20 four-day-old female flies. After treatment, they were placed in small cylindrical recovery cages and observed 24 hours later for mortality. It should be noted that flies treated with 1 microliter of acetone were unharmed.

TABLE 1

[Toxicant: O,O-diethyl S-(5-isopropyl-2,4-dioxo-1-imidazolidinylmethyl) phosphorothiolothionate (Example 1).]

| Pest | Concentration of Toxicant in p.p.m. | Percent Kill |
|---|---|---|
| 1. Mite | 100 | 100 |
|  | 30 | 94 |
|  | 10 | 91 |
| 2. Mite eggs | 100 | 100 |
| 3. Aphids | 100 | 100 |
| 4. Flies | 1,000 | 100 |

The compounds of Examples 2 through 5 were similarly effective when used in the above tests.

We claim:

1. As a composition of matter, the organophosphorus compounds having the structural formula:

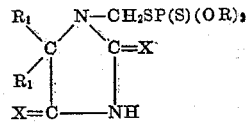

wherein R is an alkyl radical containing from 1 to 4 carbon atoms, $R_1$ is selected from the group consisting of hydrogen and alkyl radicals containing from 1 to 4 carbon atoms, one X is oxygen and the other X is selected from the group consisting of oxygen and sulfur.

2. As a composition of matter, O,O-diethyl S-(5-isopropyl-2,4-dioxo-1-imidazolidinylmethyl) phosphorothiolothionate.

3. As a composition of matter, O,O-dimethyl S-(2,4-dioxo-1-imidazolidinylmethyl) phosphorothiolothionate.

4. As a composition of matter, O,O-diethyl S-(5,5-dimethyl-2,4-dioxo-1-imidazolidinylmethyl) phosphorothiolothionate.

5. As a composition of matter, O,O-diisopropyl S-[5-(1-ethylpentyl)-2,4-dioxo-1-imidazolidinylmethyl] phosphorothiolothionate.

6. As a composition of matter, O,O-diethyl S-(5-methyl-2-thioxo-4-oxo-1-imidazolidinylmethyl) phosphorothiolothionate.

7. The method for producing organophosphorus compounds having the structural formula:

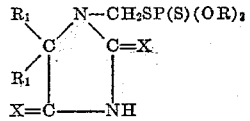

wherein R is an alkyl radical containing from 1 to 4 carbon atoms, $R_1$ is selected from the group consisting of hydrogen and alkyl radicals containing from 1 to 4 carbon atoms, one X is oxygen and the other X is selected from the group consisting of oxygen and sulfur which comprises reacting a dialkyl phosphorothiolothionate, wherein the alkyl radicals contain from 1 to 4 carbon atoms, with formaldehyde and a hydantoin having the structural formula:

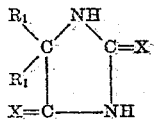

wherein $R_1$ and X are as defined above at a temperature within the range of 0 to 200° C.

8. The method for producing O,O-diethyl S-(5-isopropyl-2,4-dioxo-1-imidazolidinylmethyl) phosphorothiolothionate which comprises reacting 5-isopropylhydantoin, formaldehyde and diethyl phosphorothiolothionate at a temperature within the range of 0 to 200° C.

9. The method for producing O,O-dimethyl S-(2,4-dioxo-1-imidazolidinylmethyl) phosphorothiolothionate which comprises reacting hydantoin, formaldehyde, and dimethyl phosphorothiolothionate at a temperature within the range of 0 to 200° C.

10. The method for producing O,O-diethyl S-(5,5-dimethyl-2,4-dioxo-1-imidazolidinylmethyl) phosphorothiolothionate which comprises reacting 5,5-dimethylhydantoin, formaldehyde, and diethyl phosphorothiolothionate at a temperature within the range of 0 to 200° C.

11. The method for producing O,O-diisopropyl S-[5-(1-ethylpentyl)-2,4-dioxo-1-imidazolidinylmethyl] phosphorothiolothionate which comprises reacting 5-(1-ethylpentyl) hydantoin, formaldehyde, and diisopropyl phosphorothiolothionate at a temperature within the range of 0 to 200° C.

12. The method for producing O,O-diethyl S-(5-methyl-2-thioxo-4-oxo-1-imidazolidinylmethyl) phosphorothiolothionate which comprises reacting 5-methyl-2-thiohydantoin, formaldehyde, and diethyl phosphorothiolothionate at a temperature within the range of 0 to 200° C.

References Cited in the file of this patent

UNITED STATES PATENTS

| | | |
|---|---|---|
| 2,566,129 | Hook et al. | Aug. 28, 1951 |
| 2,566,288 | Hook et al. | Aug. 28, 1951 |
| 2,779,764 | Paterson | Jan. 29, 1957 |

FOREIGN PATENTS

| | | |
|---|---|---|
| 1,093,728 | France | May 9, 1955 |

OTHER REFERENCES

Frear et al.: J. of Economic Entomology, vol. 40, pp. 736-41 (1947).